(12) United States Patent
Olszewski et al.

(10) Patent No.: US 8,458,401 B2
(45) Date of Patent: *Jun. 4, 2013

(54) DEMAND BASED PARTITIONING OF MICROPROCESSOR CACHES

(75) Inventors: Bret Ronald Olszewski, Austin, TX (US); Steven Wayne White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,443

(22) Filed: Feb. 16, 2012

(65) Prior Publication Data
US 2012/0144121 A1 Jun. 7, 2012

Related U.S. Application Data (63) Continuation of application No. 12/437,624, filed on May 8, 2009, now Pat. No. 8,195,879.

(51) Int. Cl.
*G06F 12/08* (2006.01)
(52) U.S. Cl.
USPC .......................................... 711/119; 711/103
(58) Field of Classification Search
USPC ................................. 711/119, 103
See application file for complete search history.

(56) References Cited

U.S. PATENT DOCUMENTS

| 7,266,823 | B2 | 9/2007 | Alford, Jr. |
| 7,290,259 | B2 | 10/2007 | Tanaka et al. |
| 8,046,538 | B1 * | 10/2011 | Stenstrom ...................... 711/119 |
| 8,140,739 | B2 | 3/2012 | Langlois |
| 2002/0078309 | A1 * | 6/2002 | Arimilli et al. ................ 711/147 |
| 2005/0120163 | A1 | 6/2005 | Chou et al. |
| 2005/0223005 | A1 | 10/2005 | Shultz et al. |
| 2006/0136667 | A1 | 6/2006 | Shultz et al. |
| 2009/0083493 | A1 | 3/2009 | Kinter |
| 2009/0138660 | A1 | 5/2009 | Bell et al. |
| 2009/0164731 | A1 | 6/2009 | Le et al. |
| 2010/0088673 | A1 | 4/2010 | Chen et al. |
| 2010/0106912 | A1 | 4/2010 | Cypher et al. |
| 2010/0287339 | A1 | 11/2010 | Olszewski et al. |

OTHER PUBLICATIONS

Przybylski, Steven A.; "Cache and Memory Hierarchy Design: A performance-directed approach", copyright 1990; Morgan Kaufmann Publishers, Inc.; pp. 9-13, 18-20, 21-157.

(Continued)

*Primary Examiner* — Michael Tran
(74) *Attorney, Agent, or Firm* — Robert H. Frantz; David A. Mims, Jr.

(57) ABSTRACT

Associativity of a multi-core processor cache memory to a logical partition is managed and controlled by receiving a plurality of unique logical processing partition identifiers into registration of a multi-core processor, each identifier being associated with a logical processing partition on one or more cores of the multi-core processor; responsive to a shared cache memory miss, identifying a position in a cache directory for data associated with the address, the shared cache memory being multi-way set associative; associating a new cache line entry with the data and one of the registered unique logical processing partition identifiers; modifying the cache directory to reflect the association; and caching the data at the new cache line entry, wherein the shared cache memory is effectively shared on a line-by-line basis among the plurality of logical processing partitions of the multi-core processor.

18 Claims, 6 Drawing Sheets

OTHER PUBLICATIONS

Vetter, Scott, et al.; "IBM System p5 Quad-Core Module Based on POWER5+ Technology: Technical Overview and Introduction", copyright 2006, International Business Machines Corporation, pp. 1-10.

Milberg, Ken; "POWER5 Architecture", retrieved from http://www.unis-linux.org, pp. 1-28.

Vagmo, Morten, et al.; "Advanced POWER Virtualization on IBM System p5: Introduction and Configuration"; retrieved on Feb. 11, 2008 from http://www.redbooks.ibm.com/abstracts/sg247940.html?Open.

USPTO; Examination Correspondence from a related (Now allowed) U.S. Appl. No. 12/437,624, filed May 8, 2009 by Bret R. Olszewski.

USPTO; Examination Correspondence from a Related U.S. Appl. No. 13/398,292, filed Feb. 16, 2012 by Bret Ronald Olszewski.

USPTO; first office action mailes Sep. 12, 2012 in related U.S. Appl. No. 13/398,292, filed Feb. 16, 2012.

Olszewksi, B.; reply to first office action made on Dec. 12, 2012 in related U.S. Appl. No. 13/398,292, filed Feb. 16, 2012.

\* cited by examiner

DEMAND BASED PARTITIONING OF MICROPROCESSOR CACHES

CROSS-REFERENCE TO RELATED APPLICATIONS

Claiming Benefit Under 35 U.S.C. 120

The present patent application is a continuation of U.S. patent application Ser. No. 12/437,624, filed on May 8, 2009 now U.S. Pat. No. 8,195,879, by Bret R. Olszewski, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

The present invention to circuits, processes, and design structures for microprocessor cache control.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

Modern microprocessors make extensive use of cache memories. In general, cache memories are memories which require less time to access data, either storing or retrieving, than the time require to access data from a larger pool of memory.

Microprocessor cache design is a well-developed art, so the purpose of the following background paragraphs is to establish some terminology. For more details on cache design as it is understood in the art at the time of our invention, it is recommended to refer to a broadly-used text such as "Cache and Memory Hierarchy Design, A Performance-Directed Approach", but Steven A. Prizybylski (Morgan Kaufmann Publishers, Inc., San Mateo, Calif., copyright 1990).

Figure 1:
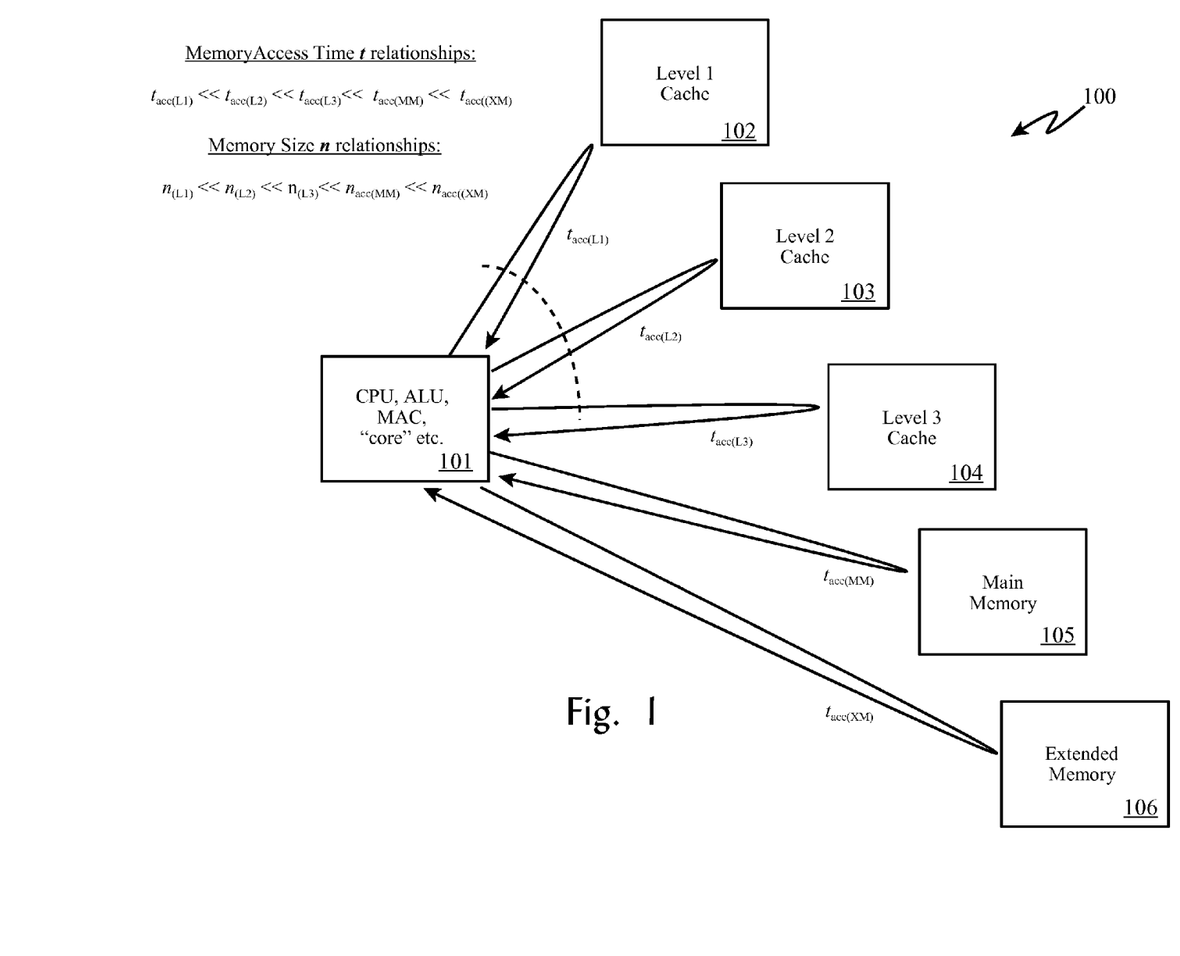
FIG. 1 illustrates access time and memory amounts of various hardware memories in a computer system.

FIG. 1 provides a general reference model (100) of various microprocessor-related memory structures and the core of a microprocessor (101). This figure is not a schematic, but instead is a functional depiction of access times $t_{acc}$. It is important to note that cache memories are not software-defined structures, such as software-defined queues or pages, but are generally banks of hardware memory. For this reason, the hardware design committed to silicon during the design phase of a new microprocessor impacts the microprocessor's ability to carry out certain tasks, either positively or negatively. But, as a hardware design, it is unchangeable and becomes a performance feature (or short coming) of a particular microprocessor. This fact, in part, explains the wide variety of microprocessors which are available on the market even today, including reduced instruction set (RISC), Advanced RISC (ARM), and digital signal processors (DSP), to mention a few. Some microprocessors find their optimal use in personal computers, while others find their optimal use in mobile devices (cell phones, PDA's, etc.), and yet others find their optimal application in specialty devices (instrumentation, medical devices, military equipment, etc.).

As such, the central processing unit (CPU), arithmetic logic unit (ALU), or multiplier-accumulator (MAC) represented in FIG. 1 as #101 functionally stands for the calculating and decision making portion of a microprocessor. In some microprocessor designs, this functional portion of a microprocessor may be given a different name, especially to emphasize any special operation or optimized functionality of the portion of the microprocessor.

A microprocessor-based circuit, such as a computer "motherboard", a "blade server" board, or a circuit board of a mobile device, will usually include a considerable amount of general purpose memory, which we will refer to as "main memory" (105). Main memory is usually not included in the same integrated circuit (IC) with the microprocessor, but instead is usually provided in one or more separate IC devices.

However, main memory is typically relatively slow to access $t_{acc(MM)}$ because very fast access memory is expensive. So, in order to balance cost versus the need for a large amount of main memory, an affordable but slower main memory device is employed.

To improve performance of the microprocessor, a Level 1 cache memory (102) ("L1 cache") is often included on the same IC as the processor the calculating and decision making portion (101). As such, the access time of the L1 cache is at the same internal fast speed of the processor core itself because there is no additional delay to convert the internal voltages and signals to chip-external voltages and signals such as the microprocessor's external address, control, and data busses. As such, the access time of the L1 cache $t_{acc(L1)}$ is much less that that to the main memory $t_{acc(MM)}$.

Because the extra "gates" employed in the L1 memory are very expensive "real estate" on an IC die, the determination of how many bytes, words, kilobytes, etc., of L1 memory to design into the microprocessor is driven by the types of applications intended for the microprocessor, which includes cost targets, heat and power requirements, size requirements, etc. For these reason, the amount $n_{(L1)}$ of L1 cache is usually much, much less than the amount $n_{(MM)}$ of the main memory.

Many microprocessors also have a secondary or Level 2 of cache memory ("L2 cache"), which is faster to access $t_{acc(L2)}$ than main memory $t_{acc(MM)}$, but slower to access than L1 cache $t_{acc(L1)}$. Similarly, it is usually provided in greater amount $n_{(L2)}$ than L1 cache $n_{(L1)}$, but in greater amount than main memory $n_{(MM)}$. Some L2 caches are "on chip" with the L1 cache and the processor the calculating and decision making portion, and some are off-chip (e.g. in a separate IC). Off-chip L2 cache is often interconnected to the microprocessor using a special external buss which is faster than the buss to the main memory.

Similarly, an even greater amount (than L1 or L2) of memory may be provided in an Level 3 cache memory ("L3 cache) (104), but less than the amount of main memory. And, similarly, the access time $t_{acc(L3)}$ to the L3 cache is greater than that of the L1 or L2 cache, but still considerably faster than the access time to the main memory.

And, additional memory, such as removable memory cards, hard drives, embedded memory on expansion cards (video and graphics cards, network interface cards, etc.) may be provided which we will refer to collectively as "extended memory" (106), which is slower to access $t_{acc(XM)}$ than main memory, but is usually provided in much greater amount $n_{(XM)}$ than main memory.

Thus, two sets of relationships of access time and amount are generally true for these types of memories, where the operator "<<" represents "is much less than":

$$t_{acc(L1)} << t_{acc(L2)} << t_{acc(L3)} << t_{acc(MM)} << t_{acc(XM)} \qquad \text{Eq. 1}$$

and:

$$n_{(L1)} << n_{(L2)} << n_{(L3)} << n_{(MM)} << n_{(Xm)} \qquad \text{Eq. 2}$$

"Multiprocessing", "multicore" processing, and "multi-threading" are terms which are used commonly within the art of computing. However, their context often dictates their exact meaning. For our purposes of this disclosure, we will use the following definitions:

| | |
|---|---|
| "process" - | a single software program or function being performed by a computer; |
| "software thread" - | a special type of process or part of a process which can be replicated so that multiple, independent copies of the process can be executed, often apparently simultaneously through time sharing or time division multiplexing of a single (or multiple) microprocessors; |
| "hardware thread" - | a division of a processor or core which allows multi-thread threads of execution; |
| "multithreading" - | the act of executing multiple threads on a single microprocessor or among multiple microprocessors; |
| "multiprocessing" - | using two or more CPU's, ALU's, or MAC's within a single computer system to accomplish one or more processes or threads; |
| "multi-core" - | a type of multiprocessor in which the plurality of CPU's ALU's, and/or MAC's are contained within a single IC or on separate IC's which are packaged together in a single package; |
| "hypervisor" - | also referred to as a virtual machine monitor, allows "virtualization" of a computing platform, often a multi-procesor computing platform, such that multiple operating systems may execute applications concurrently on the same computing platform; and |
| "processing partition" - | a portion of computing platform execution time and resources assigned to one of multiple operating systems by a hypervisor. |

As is known in the art, multithreading is often accomplished with operating system functionality which time shares the processor(s) among the multiple thread. And, multiprocessors or multi-core processors can be employed to execute a single process divided amongst the multiple CPUs, or employed to execute multiple threads or processes divides amongst the multiple CPUs.

SUMMARY OF THE INVENTION

The present invention manages and controls associativity of a multi-core processor cache memory to a logical partition by:

(a) receiving a plurality of unique logical processing partition identifiers into registration of a multi-core processor, wherein the unique partition identifiers are each associated with a logical processing partition executing on at least one core of the multi-core processor;

(b) responsive to translation of an memory cycle address resulting in a shared cache memory miss, identifying a position in a cache directory for data associated with the address, wherein the shared cache memory is multi-way set associative;

(c) responsive to the identifying of a position, associating a new cache line entry with the data and one of the registered unique logical processing partition identifiers;

(d) responsive to the associating of a new cache line entry, modifying the cache directory to reflect the association; and (e) responsive to modifying the cache directory, caching the data at the new cache line entry, wherein the shared cache memory is effectively shared on a line-by-line basis among the plurality of logical processing partitions of the multi-core processor.

Embodiments of the invention include, but are not limited to, fabricated circuits, design structures for such circuits, and processes as described herein.

BRIEF DESCRIPTION OF THE DRAWINGS

The following detailed description when taken in conjunction with the figures presented herein provide a complete disclosure of the invention.

DETAILED DESCRIPTION OF THE INVENTION

The following detailed description of embodiments according to our invention are provided to illustrate the manner of making and using our invention, but are not intended to represent the scope of the invention. Rather, the claims should be utilized to establish the scope of the present invention. For example, many of the embodiment descriptions provided herein will refer to implementation with a POWER5-based computer (POWER5™), which is an International Business Machines Corporation (IBM)™ quad-core multiprocessor. The invention, however, is not limited to use with a POWER5™ multiprocessor, but may be applied beneficially to other multiprocessors as well.

POWER5 Architecture

Figure 4:
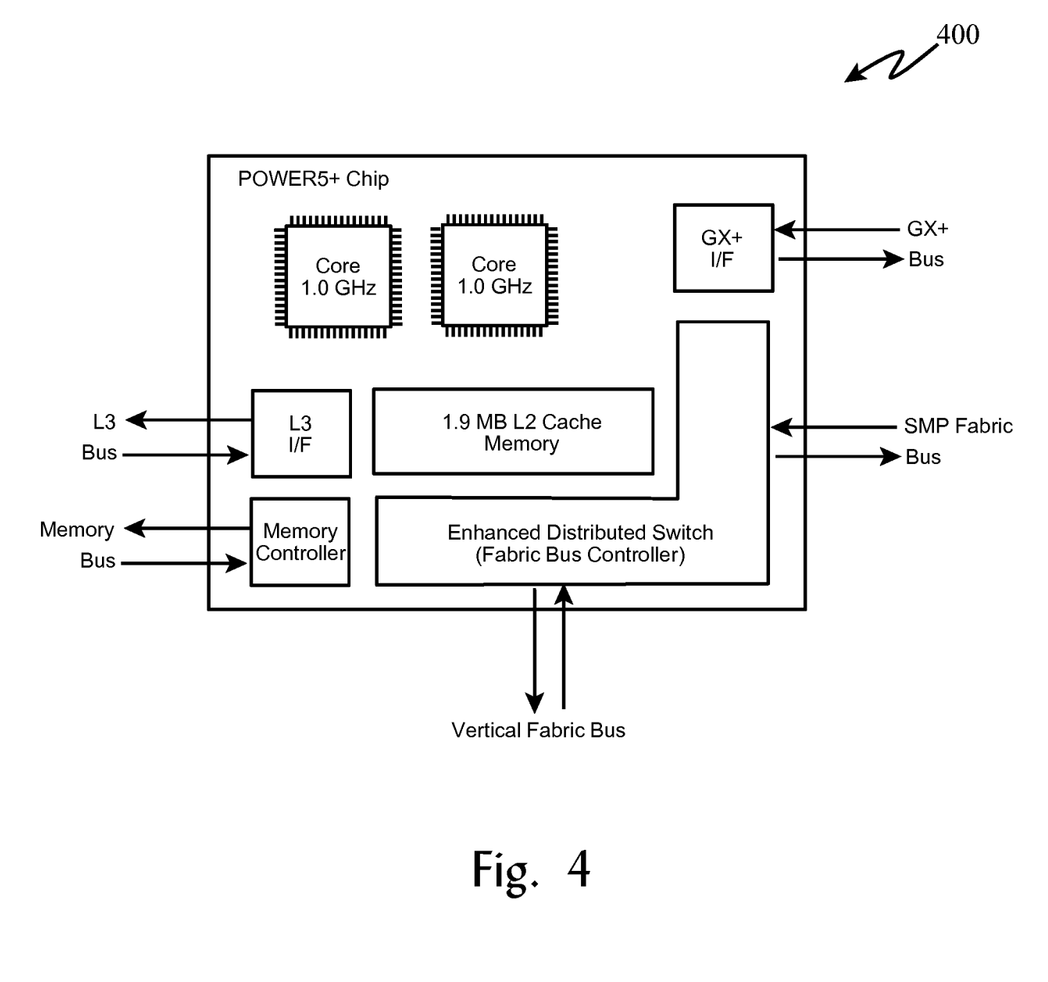
FIG. 4 provides a high level view of an IBM POWER5+™ multi-core processor.

For the convenience of the reader, a brief overview of a POWER5+™ processor chip is shown in FIG. 4. According to the IBM™ publication "IBM System p5 Quad-Core Module Based on POWER5+ Technology: Technical Overview and Introduction" Redbooks paper by Scott Vetter, et al., copyright 2006:

"The POWER5+ chip features single-threaded and multi-threaded execution for higher performance. A single die contains two identical processor cores, each of which uses simultaneous multithreading to supporting two logical threads. This architecture makes a single dual-core POWER5+ chip appear to be a four-way symmetric multiprocessor to the operating system. The POWER5+ processor supports the 64-bit PowerPC® architecture.

The POWER5+ chip has a 1.9 MB on-chip L2 cache that is implemented as three identical slices with separate controllers for each. Either processor core can independently access each L2 controller. The L3 cache, with a capacity of 36 MB, operates as a back door with separate buses for reads and writes that operate at half processor speed."

Not shown in this high level (and highly simplified) block diagram is the on-chip L3 cache directory and the cache controller, all of which are implemented in hardware circuitry on the chip.

Discovery of a Problem

Cache design has beguiled microprocessor designers for decades. Numerous theories have developed and been argued, and many have been implemented and proved or disproved in various microprocessor designs over the years. As new applications arise, such as a web browsing or video editing, the schemes of providing caches to microprocessors have evolved to respond to the different types of data and instructions demanded by these applications.

Multi-core processors such as the POWER5™ often share some levels of cache between the cores of the processor. The POWER5™ shares the L2 and L3 caches among the cores and among the threads running on the cores. The POWER5 in particular has one L1 cache dedicated to each of the four cores (e.g. for a total of four L1 caches), shares a single on-chip L2 cache among the four cores (and among their threads), and shares a single off-chip L3 cache among the four cores (and among their threads). In the POWER5™ architecture, an on-chip directory for the off-chip L3 cache is provided which allows the location of off-chip L3 data faster, even though the actual access to those locations eventually incurs the off-chip L3 access time. By providing the L3 cache directory on-chip with the four cores, the L3 data location process accelerated, which improves L3 cache performance over designs with off-chip L3 cache directories.

Significant measurement and analysis of POWER5-based systems using Advanced POWER Virtualization (APV) identified the sharing of on-chip and off-chip caches between partitions as a significant performance issue to shared processor partitions. Consider the case of two microprocessor cores sharing both an L2 cache and an L3 cache. Now consider two hardware and sharing control configuration cases: first, a single processing partition runs on one of the cores and the other core is idle, and, second, one processing partition runs on one core and another independent processing partition runs on the second core.

If we compare the performance of the two cases, we see that the performance generated for the partition in the first case is higher than the individual performance of the partitions in the second case. The chief contributor is interference in (contention for) the shared caches.

Overview of the Invention

The basic innovation of our invention is that it could be desirable and beneficial to partition a shared cache in the case that distinct processing partitions are accessing the shared cache concurrently, but also allow the entire shared cache to be used if a single processing partition is running on one or more of the cores that share the cache.

It should be mentioned that most cache control in a multi-processor is implemented in hardware logic (e.g. micro-circuitry), micro-coding, or a combination of micro-coding and micro-circuitry.

In order to accomplish this level of control of the cache, a first piece of information created is a unique processing partition identifier. Fortunately, most Hypervisors have this concept already incorporated into them. For the purposes of this disclosure, we will assume each partition is given a unique numerical identifier by a Hypervisor. For implementations without this existing hypervisor function, such a function should be added to the Hypervisor or virtual machine monitor.

In practice, the hardware may actually use a subset of the bits in the numerical identifier, if the Hypervisor is reasonably careful in running concurrent partitions with similar partition identifiers.

Second, embodiments according to the invention provide that the processing partition identifier for the processing partition running on a core is directly communicated to that core. This may be implemented as a register in the core of the microprocessor. The processing partition identifier is written or stored into the core's registration when the Hypervisor dispatches a virtual processor for a partition.

Third, embodiments according to the invention provide that the Hypervisor generically identifies the processing partition identifier of an otherwise idle core as zero as a convention, although other default identifier values could be employed as well. For the purposes of this disclosure and its illustrations, we will use zero.

Fourth, when an address is translated by the cache controller and a cache miss occurs, a position in the directory for the data is identified. For this invention, the shared cache must be at least two way set associative. That means that each physical address->set has multiple mappings. According to this aspect of the invention, a two-way set associative cache has two unique mappings available, a four-way set associative cache has four unique mappings available, and so forth. Generally, these mappings are used to "age" cache lines which are infrequently used, while keeping frequently used ones in the cache. Multiple entries also alleviates the "thrashing" between two frequently referenced cache lines in the case where they would otherwise map to a single entry.

Figure 2:
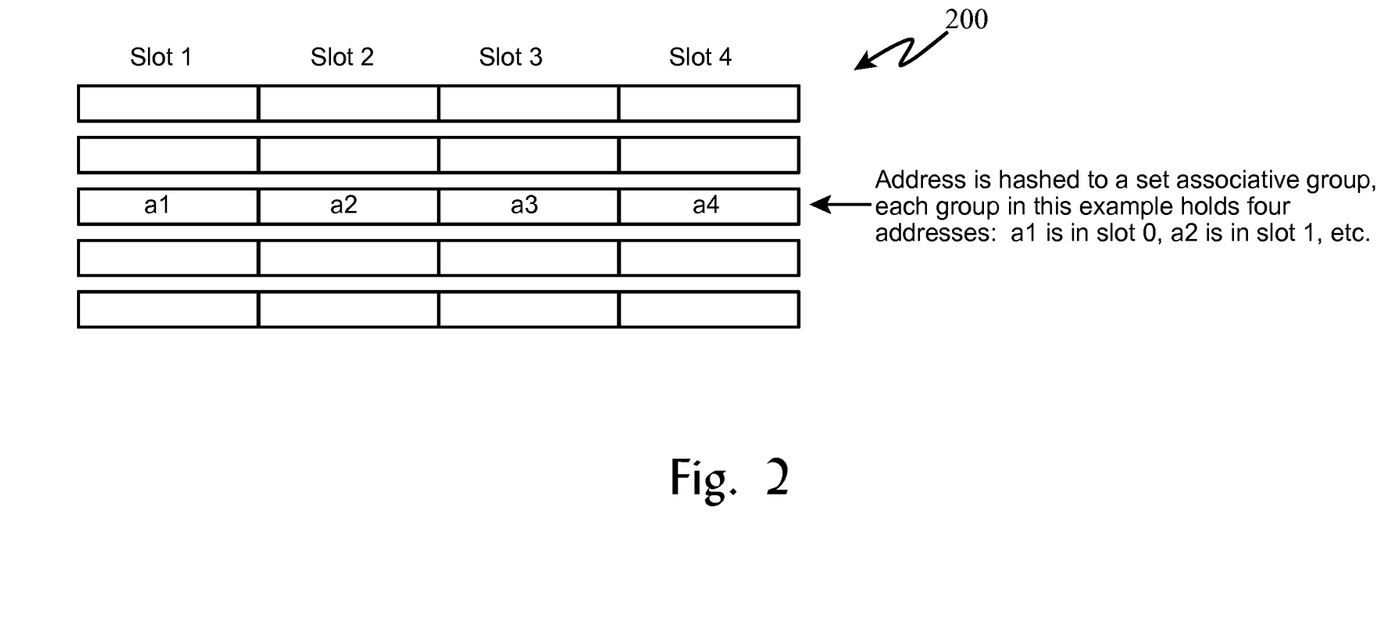
FIG. 2 is an example four-way set associative cache directory is shown.

Turning to FIG. 2, a cache directory for a four-way set associated cache example (200) is provided according to the invention. In this depiction, the address is hashed to a set associative group, each group holding four addresses (a1 in slot 1, a2 in slot 2, etc.). There would be more entries depending on the size of the cache.

The cache controller aging mechanism employed does not have to be a pure least-recently used (LRU) scheme, but rather can be an approximation. For a four-way set associative cache, the aging mechanism can be accomplished with three bits per set associative group. The first bit identifies if the newest line is in the top half of the set or the bottom half of the set. The second and third bits identify the newest line within the subsets, as shown (300) in FIG. 3.

Fifth, when an address is translated by the cache controller and a cache miss occurs, the hardware compares the partition identifiers of the cores currently operating upon the shared cache. Thus for the example where there are two cores sharing a cache, the cases are:

TABLE

Two Cores Sharing One Cache Example

| Core A State | Core B State | Desired Outcome |
|---|---|---|
| (a) executing partition N | idle | Core A and processing partition N are allowed to use the entire shared cache |
| (b) idle | executing partition N | Core B and processing partition N are allowed to use the entire shared cache |
| (c) executing partition N | executing | Cores A and B and processing |

TABLE-continued

Two Cores Sharing One Cache Example

| Core A State | Core B State | Desired Outcome |
| --- | --- | --- |
| (d) executing partition N | partition N | partition N are allowed to use the entire shared cache |
| | executing partition M | Core A and processing partition N are allowed to use one half of the shared cache, Core B and processing partition M are allowed to use the other half of the share cache |

To select the placement of a new cache line into the set associative class, the partition identifiers are compared. If they are the same, an LRU process is performed. If either of the cores is actually idle (with the unique idle partition identifier), an LRU process is performed. But, if the two cores have different partition identifiers, the allocation for the new cache line will come from either the upper half of the class or the bottom half of the class. In that way, each partition will effectively be limited to ½ of the cache.

Figure 3:
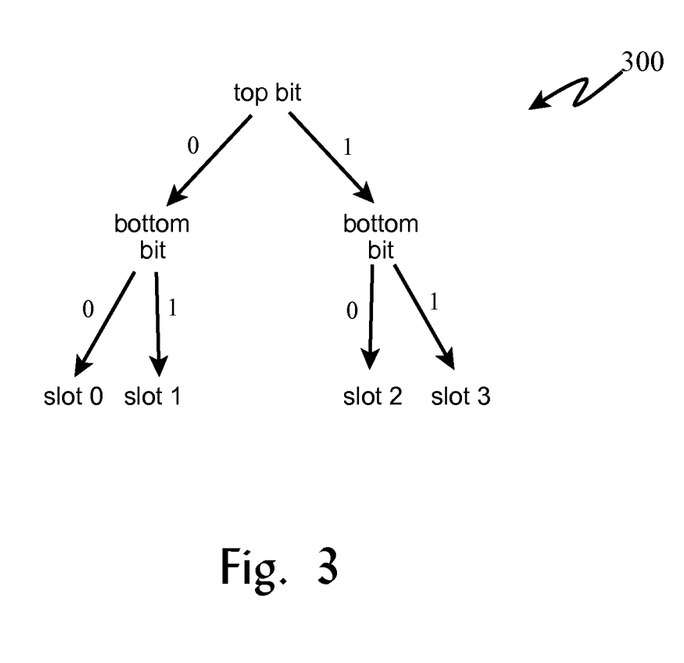
FIG. 3 depicts one available embodiment for an aging mechanism using three bits per set associative group for a four-way set associative cache.

For example, referring to FIG. 3, partition ID 1 might be allowed to use slots 0 and 1 of each set associativity group, whereas partition ID 2 might be allowed to use slots 2 and 3 of each set associativity group.

According to another aspect of the present invention, if the cache has sufficient set associative, LRU can continue to be used for the subset of the set associativity group where the new line was placed.

Note that embodiments according to the invention can be extended to support as many active partitions as the "set associativity" of the cache in question. Four active partitions could be supported on a 4-way set associated cache, 8-way set associative cache, or higher. Eight active partitions could be supported on an 8-way set associated cache, a 16-way set associative cache, or higher. In general, the invention works best if the set associativity of the cache divides evenly into the set associativity of the cache.

It should also be noted that the fourth and fifth aspects of the invention described in the foregoing paragraphs represent significant departures from cache designs and cache control methods presently used in the art.

An aspect of an enhancement according to the invention includes invoking the cache partitioning control logic on a usage threshold basis. This can be implemented with a set of counters that tracks cache line count by partition, incremented when a partition allocates and decrements when a line is displaced.

For example, if the state of the total cache was known such that the amount of cache used by the current partitions could be determined, partitioning can be invoked dynamically. As an example, consider a threshold of 75%. If two partitions (A and B) where currently operating on the cache and neither partition in the example used 75% of the cache, pure LRU usage of the cache would continue. If two partitions (A and B) were currently operating on the cache and partition A achieved a threshold of using 75% of the cache, the usage of a subset of the set associative groups could be invoked. In this way, a portion of the cache is protected for partition B, based on instantaneous usage.

Logical Operations of the Invention

Figure 5:
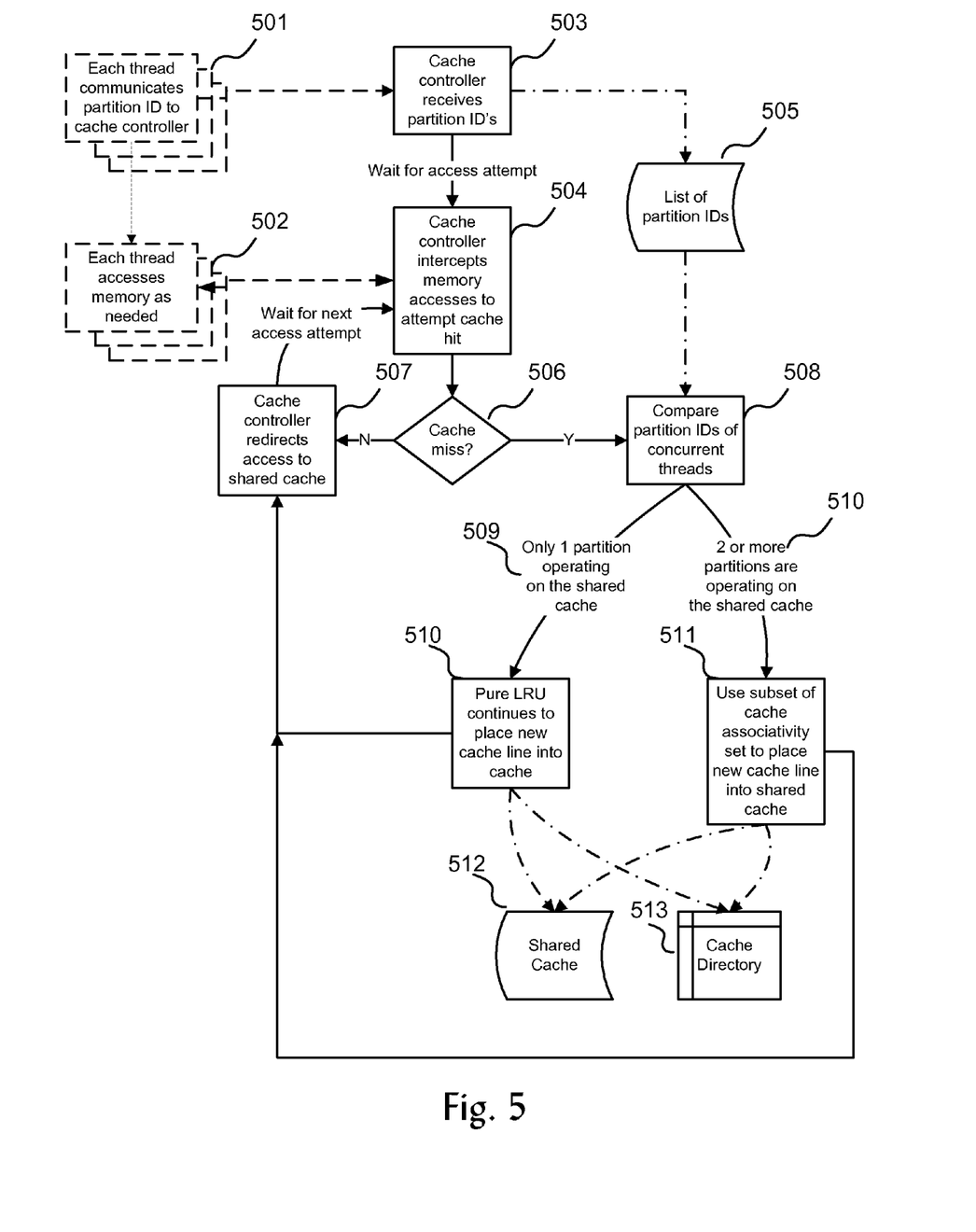
FIG. 5 illustrates a logical process according to the present invention suitable for realization as microcode, microcircuitry, or a combination of microcode and microcircuitry in a multi-core processor design.

The logical process (500) shown in FIG. 5 according to the present invention is suitable for implementation in the cache controller for a multi-processor. Although it is shown as a logical sequence of steps, such logical models can be readily converted into circuitry design (e.g. gates) for implementation into an IC using various techniques such as VHSIC Hardware Description Language (VHDL), where VHSIC stands for Very High Speed Integrated Circuits.

According to this embodiment of the invention, each thread of execution (501) (or core of execution when threads much always be in the same partition) communicates to the microprocessor's cache controller (503) a unique partition ID (505). Then, each thread executes normally, attempting to access data and/or instructions in memory (502) which may or may not be cached.

The cache controller intercepts (or monitors) (504) the access attempts from each core and each thread in each core. On a cache hit (506) (e.g. the requested information is already stored in a L1, L2 or L3 cache), the cache controller redirects the access to the appropriate cache and location within the cache normally (507).

However, on a cache miss (506) (e.g. the requested information is not in a cache yet), the partition ID's (505) of the concurrent threads of execution would be compared (508) by the cache controller to identify the following cases:

(509) only one partition is operating on the shared cache, which could be due to the same partition spanning the threads or cores with multiple virtual processors, or could be due to a subset of the cores being currently idle (e.g. not executing a partition); or (510) two or more partitions are operating on the shared cache.

In the case of one partition operating on the shared cache (509), the cache controller then performs pure LRU processes (510) for the placement of the new cache line into the cache (512), modifying the cache directory (513) appropriately, followed by redirecting the access to the newly placed cache line (507).

In the case of two or more partitions actively operating on the shared cache (510), a subset of the cache associativity set is used for the placement of the new line in the cache (512) based on partition identifier as previously described, and the cache directory (513) is modified followed by redirecting the access attempt to the new line in the cache (507).

Then, the cache controller returns to its previous state of waiting for a memory access attempt from a thread.

According to a further refinement of the invention, based on threshold, pure LRU may be used if the partition experiencing the cache miss is below its cache usage threshold, as described in the foregoing paragraphs.

Design Structure Embodiments

The invention may also be suitably embodied as a design structure stored or encoded by a computer readable memory. Such memories include volatile as well as non-volatile memory devices, such as various types of random access memory (RAM, SRAM, DRAM, etc.), various type of read-only memories (ROM, UVEPROM, EPROM, CD-ROM, DVD, etc.), and various types of recordable memories (hard disk drive, CD-R, CD-RW, DVD-R, DVD-RW, etc.).

Figure 6:
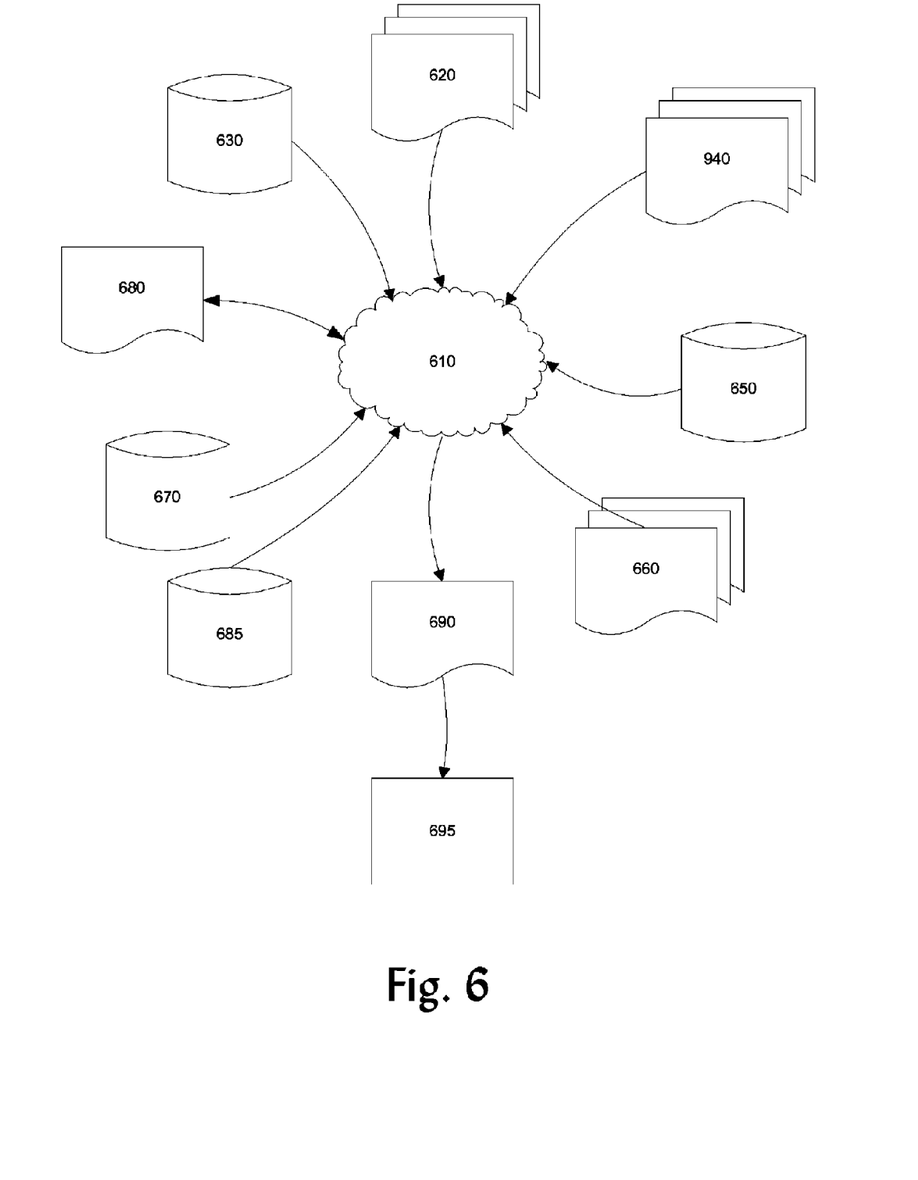
FIG. 6 is a diagram depicting a design process used in semiconductor design, manufacture, and/or test, suitable for producing and using a design structure for a semiconductor.

FIG. 6 shows a block diagram of an exemplary design flow used for example, in semiconductor design, manufacturing, and/or test. Design flow may vary depending on the type of IC being designed. For example, a design flow 900 for building an application specific IC (ASIC) may differ from a design flow for designing a standard component. Design structure 920 is preferably an input to a design process 910 and may come from an IP provider, a core developer, or other design company or may be generated by the operator of the design flow, or from other sources. Design structure 920 comprises an embodiment of the invention as shown in FIG. 5 in the form of schematics or HDL, a hardware-description language (e.g., Verilog, VHDL, C, etc.). Design structure 920 may be contained on one or more machine readable memories. For example, design structure 920 may be a text file or a graphical representation of an embodiment of the invention as shown in FIG. 5.

Design process 910 preferably synthesizes (or translates) an embodiment of the invention into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information).

Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention.

The design structure of the invention is not limited to any specific design flow. Design process 910 preferably translates an embodiment of the invention as shown in FIG. 5, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures).

Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 5. Design structure 990 may then proceed to a stage 995 where, for example, design structure 990 proceeds to tape-out, is released to manufacturing, is released to a mask house, is sent to another design house, is sent back to the customer, etc.

conclusion

While certain examples and details of a preferred embodiment have been disclosed, it will be recognized by those skilled in the art that variations in implementation such as use of different programming methodologies, microprocessor architectures, and processing technologies, may be adopted without departing from the spirit and scope of the present invention. Therefore, the scope of the invention should be determined by the following claims.

What is claimed is:

1. A cache controller design structure comprising:
a tangible, computer readable memory device suitable for encoding circuit design structures; and
one or more computer readable design structures encoded by the computer readable memory, the design structures comprising:
one or more registers receiving and storing a plurality of unique logical processing partition identifiers, wherein the unique partition identifiers are each associated with a logical processing partition executing on at least one core of the multi-core processor;
a position identifier, responsive to translation of an memory cycle address resulting in a shared cache memory miss, identifying a position in a cache directory for data associated with the address, wherein the shared cache memory is at least two way set associative;
a line associator, responsive to the position identifier, associating a new cache line entry with the data and one of the registered unique logical processing partition identifiers;
a directory modifier, responsive to the line associator, modifying the cache directory to reflect the association; and
a memory access redirector, responsive to the directory modifier, caching the data at the new cache line entry, wherein the shared cache memory is effectively shared on a line-by-line basis among the plurality of logical processing partitions of the multi-core processor.

2. The design structure as set forth in claim 1 wherein the design structure encoded by the tangible, computer readable memory device further comprises:
an identifier comparator, responsive to a cache miss, compares the registered partition identifiers of cores currently operating upon the shared cache memory; and
wherein the line associator and the directory modifier, responsive to the comparison determining that at least N different cores are operating on the shared cache, wherein N is a value equal to or greater than 2:
allocate a new line in the cache memory from a $1/N^{th}$ portion of a total size of the cache memory, and
place the new line by employing a Least-Recently Used cache line placement method within the $1/N^{th}$ portion.

3. The design structure as set forth in claim 1 wherein the design structure encoded by the tangible, computer readable memory device further comprises:
an identifier comparator, responsive to a cache miss, compares the registered partition identifiers of cores currently operating upon the shared cache memory; and
wherein the line associator and the directory modifier, responsive to the comparison determining that at least N different cores are operating on the shared cache:
dynamically partition the shared cache according to a maximum utilization threshold wherein a portion of the shared cache is allocated to a particular core, the portion being less than the threshold, and
place the new cache line by employing a Least-Recently Used cache line placement method within the allocated cache portion.

4. The design structure as set forth in claim 1 wherein the multi-way set associative cache has two unique mappings available.

5. The design structure as set forth in claim 1 wherein the multi-way set associative cache is four-way associative having four unique mappings available.

6. The design structure as set forth in claim 1 wherein the set associativity is employed to age and re-associate cache lines that are infrequently used, while retaining associating of frequently used lines in the shared cache memory.

7. A method for controlling a computer cache comprising:
receiving and storing into one or more computer registers a plurality of unique logical processing partition identifiers, wherein the unique partition identifiers are each associated with a logical processing partition executing on at least one core of the multi-core processor;

responsive to translation of an memory cycle address resulting in a shared cache memory miss, identifying by a computer a position in a cache directory for data associated with the address, wherein the shared cache memory is at least two way set associative;

responsive to the identifying of a position, associating by a computer a new cache line entry with the data and one of the registered unique logical processing partition identifiers;

responsive to the associating of a cache line entry, modifying by a computer the cache directory to reflect the association; and responsive to the modifying the directory, caching by a computer the data at the new cache line entry, wherein the shared cache memory is effectively shared on a line-by-line basis among the plurality of logical processing partitions of the multi-core processor.

8. The method as set forth in claim 7 further comprising:
responsive to a cache miss, comparing by a computer the registered partition identifiers of cores currently operating upon the shared cache memory; and
wherein the line associating and the directory modifying, responsive to the comparison determining that at least N different cores are operating on the shared cache, and wherein N is a value equal to or greater than 2, comprise:
allocating a new line in the cache memory from a $1/N^{th}$ portion of a total size of the cache memory, and
placing the new line by employing a Least-Recently Used cache line placement method within the $1/N^{th}$ portion.

9. The method as set forth in claim 7 further comprising:
responsive to a cache miss, comparing by a computer the registered partition identifiers of cores currently operating upon the shared cache memory; and
wherein the line associating and the directory modifying, responsive to the comparison determining that at least N different cores are operating on the shared cache, comprise:
dynamically partitioning the shared cache according to a maximum utilization threshold wherein a portion of the shared cache is allocated to a particular core, the portion being less than the threshold, and
placing the new cache line by employing a Least-Recently Used cache line placement method within the allocated cache portion.

10. The method as set forth in claim 7 wherein the multi-way set associative cache has two unique mappings available.

11. The method as set forth in claim 7 wherein the multi-way set associative cache is four-way associative having four unique mappings available.

12. The method as set forth in claim 7 wherein the set associativity is employed to age and re-associate cache lines that are infrequently used, while retaining associating of frequently used lines in the shared cache memory.

13. A cache controller apparatus comprising:
one or more computer registers for receiving and storing a plurality of unique logical processing partition identifiers, wherein the unique partition identifiers are each associated with a logical processing partition executing on at least one core of the multi-core processor;
a position identifier portion of a computer system for, responsive to translation of an memory cycle address resulting in a shared cache memory miss, identifying a position in a cache directory for data associated with the address, wherein the shared cache memory is at least two way set associative, wherein the computer system comprises a processor;
a line associator portion of a computer system for, responsive to the position identifier, associating a new cache line entry with the data and one of the registered unique logical processing partition identifiers;
a directory modifier portion of a computer system, responsive to the line associator, modifying the cache directory to reflect the association; and
a memory access redirector portion of a computer system for, responsive to the directory modifier, caching the data at the new cache line entry, wherein the shared cache memory is effectively shared on a line-by-line basis among the plurality of logical processing partitions of the multi-core processor.

14. The apparatus as set forth in claim 13 wherein further comprising:
an identifier comparator portion of the computer system for, responsive to a cache miss, comparing the registered partition identifiers of cores currently operating upon the shared cache memory; and
wherein the line associator and the directory modifier are further for, responsive to the comparison determining that at least N different cores are operating on the shared cache, wherein N is a value equal to or greater than 2:
allocating a new line in the cache memory from a $1/N^{th}$ portion of a total size of the cache memory, and
placing the new line by employing a Least-Recently Used cache line placement method within the $1/N^{th}$ portion.

15. The apparatus as set forth in claim 13 further comprising:
an identifier comparator portion of the computer system for, responsive to a cache miss, comparing the registered partition identifiers of cores currently operating upon the shared cache memory; and
wherein the line associator and the directory modifier are further for, responsive to the comparison determining that at least N different cores are operating on the shared cache:
dynamically partitioning the shared cache according to a maximum utilization threshold wherein a portion of the shared cache is allocated to a particular core, the portion being less than the threshold, and
placing the new cache line by employing a Least-Recently Used cache line placement method within the allocated cache portion.

16. The apparatus as set forth in claim 13 wherein the multi-way set associative cache has two unique mappings available.

17. The apparatus as set forth in claim 13 wherein the multi-way set associative cache is four-way associative having four unique mappings available.

18. The apparatus as set forth in claim 13 wherein the set associativity is employed to age and re-associate cache lines that are infrequently used, while retaining associating of frequently used lines in the shared cache memory.

* * * * *